US009731795B2

(12) United States Patent
Deletre et al.

(10) Patent No.: US 9,731,795 B2
(45) Date of Patent: Aug. 15, 2017

(54) HANDLING SYSTEM FOR FLEXIBLE CONDUIT

(71) Applicant: GAZTRANSPORT ET TECHNIGAZ, Saint Remy les Chevr (FR)

(72) Inventors: Bruno Deletre, Versailles (FR); Arthur Barret, Paris (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 216 days.

(21) Appl. No.: 14/651,904

(22) PCT Filed: Dec. 3, 2013

(86) PCT No.: PCT/FR2013/052919
§ 371 (c)(1),
(2) Date: Jun. 12, 2015

(87) PCT Pub. No.: WO2014/096601
PCT Pub. Date: Jun. 26, 2014

(65) Prior Publication Data
US 2015/0329184 A1    Nov. 19, 2015

(30) Foreign Application Priority Data

Dec. 18, 2012  (FR) ...................... 12 62233

(51) Int. Cl.
*E03B 1/00* (2006.01)
*B63B 27/24* (2006.01)
(Continued)

(52) U.S. Cl.
CPC .............. *B63B 27/24* (2013.01); *B63B 27/34* (2013.01); *F16L 3/015* (2013.01); *F16M 11/043* (2013.01); *F16M 11/08* (2013.01); *B63B 2221/24* (2013.01)

(58) Field of Classification Search
CPC ..... B36B 27/24; B63B 27/34; B63B 2221/24; F16L 3/015; F16M 11/043; F16M 11/08; B67D 9/02; Y10T 137/8807
(Continued)

(56) References Cited

U.S. PATENT DOCUMENTS 2,818,891 A  *  1/1958  Loeser ..................... B67D 9/02
                                                       119/14.18
2,922,446 A  *  1/1960  Sheiry ..................... B67D 9/02
                                                       141/388
(Continued)

OTHER PUBLICATIONS

International Search Report for PCT/FR2013/052919 filed Dec. 3, 2013.
(Continued)

*Primary Examiner* — Gwendolyn Baxter
(74) *Attorney, Agent, or Firm* — Notaro, Michalos & Zaccaria P.C.

(57) ABSTRACT

A motorized support device for a handling system intended to handle at least one flexible pipe for transferring fluid; the support device comprises:
a frame,
a support borne by the frame, the support having an upper support surface for supporting the flexible pipe on the frame, and a drive member borne by the frame and able to drive the flexible pipe in two-way translation in a predetermined longitudinal direction.

18 Claims, 8 Drawing Sheets

(51) Int. Cl.
*F16M 11/08* (2006.01)
*F16L 3/015* (2006.01)
*F16M 11/04* (2006.01)
*B63B 27/34* (2006.01)

(58) Field of Classification Search
USPC .......... 248/82; 137/615; 141/388; 414/139.6
See application file for complete search history.

(56) References Cited

U.S. PATENT DOCUMENTS

| | | | | |
|---|---|---|---|---|
| 3,032,082 | A | * | 5/1962 | Vilain ................ B67D 9/02 |
| | | | | 137/615 |
| 8,915,271 | B2 | * | 12/2014 | Liu .................. B63B 27/24 |
| | | | | 141/1 |
| 9,004,103 | B2 | * | 4/2015 | Foo .................. B63B 27/34 |
| | | | | 137/615 |
| 2004/0011424 | A1 | * | 1/2004 | Dupont ............... B67D 9/00 |
| | | | | 141/279 |
| 2005/0196243 | A1 | * | 9/2005 | Pollock ............. E21B 17/085 |
| | | | | 405/224.3 |
| 2012/0152366 | A1 | | 6/2012 | Foo |

OTHER PUBLICATIONS

International Patentabiltiy Report and Written Opinion or PCT/FR2013/052919 filed Dec. 3, 2013.

* cited by examiner

HANDLING SYSTEM FOR FLEXIBLE CONDUIT

The invention relates to the field of handling systems for handling a flexible pipe, notably to a system for transferring cargo between a methane tanker and a commercial ship powered by liquefied natural gas (LNG) or a terminal. It notably relates to the systems based on semi-flexible hoses which are maneuvered using lifting gear.

Solutions for transferring LNG are known and are notably derived from the technologies for transfer devices used for transferring cargo from methane tankers. Document WO 2009/071563 describes such a device. That device comprises a rigid structure arranged at the end of a barge. This rigid structure extends at an angle of 45° above sea level. This fixed structure on the barge comprises a platform overhanging the water which platform bears a device for moving a flexible hose. This device is fed from the barge with rigid pipes and connected to the flexible hose intended to be connected to a client ship. The flexible hose is fitted at its second end with a coupling for making the connection to the bunkering station of the client ship. For transferring the end of the hose, a cable secured to the coupling is transferred to the ship which, using this cable, can recover the end of the flexible hose. The movement device is lowered during the operation in order to increase the possible distance between the barge and the client ship. When transfer is complete and the hose is disconnected, it is raised in order to prevent the end of the hose from dropping into the water.

According to one embodiment, the invention provides a motorized support device for a handling system intended to handle at least one flexible pipe for transferring fluid; the support device comprises:
a frame able to be suspended from a crane,
a support borne by the frame, the support having an upper support surface for supporting the flexible pipe on the frame, and a drive member borne by the frame and able to drive the flexible pipe in two-way translation in a predetermined longitudinal direction.

According to other advantageous embodiments, such an invention may have one or more of the following features.

According to one embodiment, the support device further comprises a holding member arranged on the frame and able to collaborate with an end flange of the flexible pipe so as to hold the end flange in a fixed parked position with respect to the frame.

According to one embodiment, the holding member further comprises a means of inerting the flexible pipe; the inerting means comprises a hose connected to a source of inert gas such as nitrogen or argon and able to pass this inert gas into the flexible pipe.

According to one embodiment, the support surface has a curved shape with the convex side facing upward.

According to one embodiment, the support is able to move with respect to the frame under the effect of the drive member.

According to one embodiment, the support is fixed with respect to the frame; the support surface is able to collaborate in a sliding manner with the flexible pipe.

According to one embodiment, the support comprises a support element able to free-wheel; the support element is selected from the group consisting of: a wheel, a set of rolls, and a caterpillar track.

According to one embodiment, the support surface has a shape suited to holding the pipe in the predetermined longitudinal direction.

According to one embodiment, the device further comprises an attachment member secured to the frame; the attachment member allows the frame to be attached to the flexible pipe handling system.

According to one embodiment, the attachment member is situated above the support surface.

Such an attachment member may further comprise a damping means for damping a movement of the mobile support.

According to one embodiment, the attachment member comprises a rotary actuator capable of causing the mobile support to rotate about a vertical axis.

According to one embodiment, the device comprises a guide member for holding the flexible pipe in a fixed longitudinal orientation with respect to the support, the guide member being secured to the frame.

According to one embodiment, the guide member is arranged longitudinally on each side of the support surface.

According to one embodiment, the guide member comprises guide means arranged above the pipe and able to hold the flexible pipe pressed against the support surface.

According to one embodiment, the guide member comprises a guide element selected from the group consisting of: a rigid guide with a low coefficient of friction, a rolls stand, a rollers stand.

According to one embodiment, the drive member is selected from the group composed of: a wheel, a roller, a set of rollers, a caterpillar track, a conveyor belt and a pinion able to mesh with a toothset belonging to the pipe.

Such drive elements may be positioned at various locations, for example on the sides, the top or even the underside also acting as a support.

A support may allow the handling of one or several pipelines.

According to one embodiment, a modular support comprises a plurality of support devices, the devices being juxtaposed in such a way that the predetermined longitudinal directions are parallel, in which support the frames of the support devices have attachments able to connect said frames in the juxtaposed position.

According to one embodiment, the invention also provides a handling system intended for handling at least one flexible pipe, the system comprising a crane and a support device or a modular support, the frame of which is attached to the crane.

One idea underlying the invention is that of providing a pipe support for a cargo transfer system that can be fitted to a bunkering methane tanker capable of transferring its cargo into the reservoirs carried onboard client ships, during which transfer these ships may experience significant relative movements.

Certain aspects of the invention start out from the idea of addressing the differences in position of the bunkering stations between the various client ships and the resupply ship. What happens is that ships that are clients of the bunkering ship are provided with a bunkering station comprising connecting flanges for the supply hoses. From one client ship to another, the position of this bunkering station may vary very widely, notably in terms of elevation: from approximately one meter above the water line to sometimes more than 20 m.

Certain aspects of the invention start out from the idea of creating a system that allows easy transfer of the ends of the flexible conduits toward the bunkering station of the client ship.

Certain aspects of the invention start out from the idea of being able to create a loop of slack at the time of coupling.

Certain aspects of the invention also start out from the idea of holding the hoses during transfer, ensuring the flexibility required for the relative motion of the ships.

Certain aspects of the invention also start out from the idea of being able to recover the flexible conduits in the event of emergency disconnection or at the end of transfer.

The invention will be better understood and further objects, details, features and advantages thereof will become more clearly apparent during the course of the following description of various particular embodiments of the invention which are given solely by way of nonlimiting illustration with reference to the attached drawings.

Figure 1:
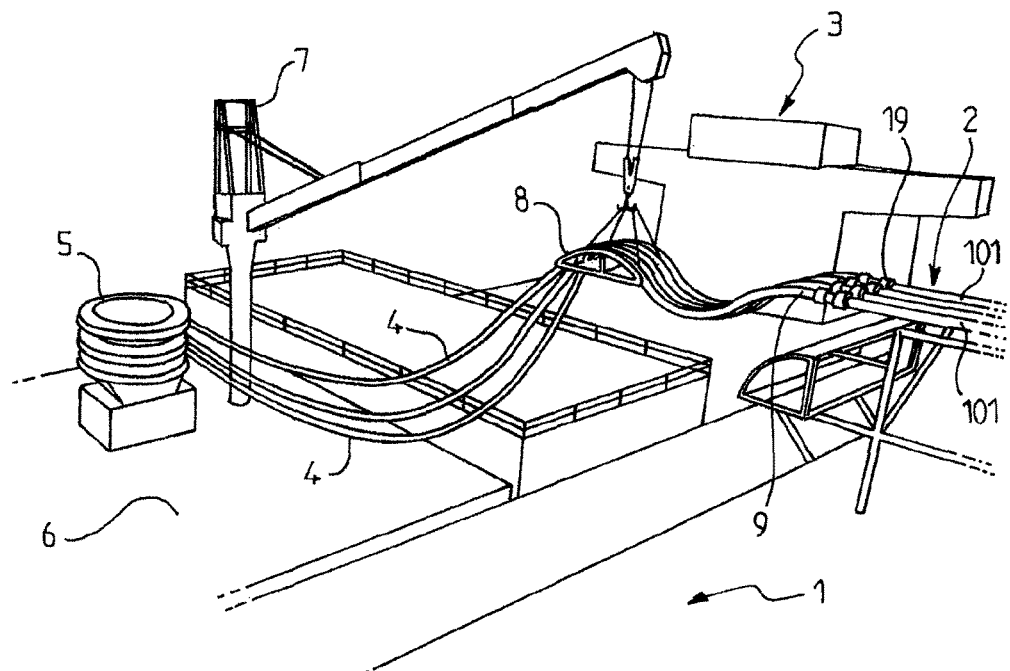
FIG. 1 is a perspective schematic view of a transfer system.

Commercial shipping powered by LNG has to be resupplied with fuel out of port, for example on the high seas. In order to do that, with reference to FIG. 1, the client ship 1 is equipped with a bunkering station 2 which comprises coupling flanges 19 for coupling supply hoses 101 for supplying the fuel tanks to the pipelines 4 of a resupply ship 3. The position of the bunkering stations varies enormously from one commercial ship to another. This is notably true of the height of the bunkering stations with respect to the deck of the resupply ship 3.

In order to perform the resupply operation, the resupply ship 3 has flexible pipelines 4 which are connected to the reservoirs of the resupply ship 3 and need to be connected to the bunkering station 2 of the client ship 1. In order to be adaptable to suit the various transfer situations, the resupply ship 3 has a reserve of length of flexible pipelines 4 wound on a drum 5 positioned on the deck 6 of the resupply ship 3. In order to couple the flexible pipelines 4, the resupply ship 3 has a telescopic arm 7 which allows the end 9 of the flexible pipelines 4 to be maneuvered with the aid of a support carriage 8. The maneuvering of this support carriage 8 also makes it possible to create a loop of slack better known by the English term of "lazy wave".

The various phases of maneuvering performed by the resupply ship 3 using the crane during a step of resupplying a client ship 1 will be described with reference to FIGS. 2 to 6.

Figure 2:
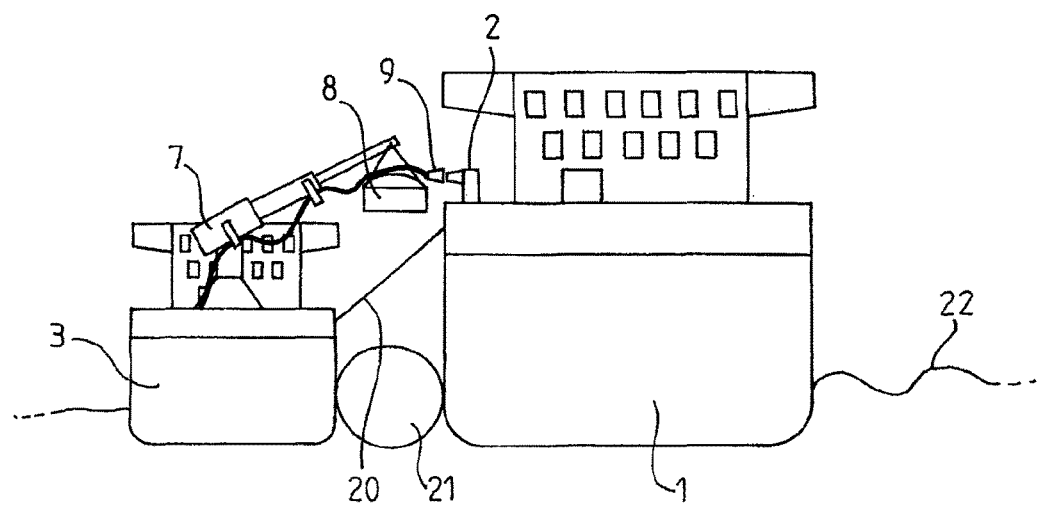
FIG. 2 is a schematic view of the system of FIG. 1 during the step of connecting a pipe.

To begin a resupply, with reference to FIG. 2, the resupply ship 3 begins by mooring alongside the client ship 1 using a mooring line 20 and a fender 21 to prevent the plating of the ships banging together under the effect of the swell 22. Next, the resupply ship 3 using the telescopic arm 7 and the support carriage 8 offers up the end 9 of the flexible pipelines 4 to the bunkering station 2 of the client ship 1. The crew of the client ship 1 can then connect the flexible pipelines 4 to those of their own bunkering station 2.

Figure 3:
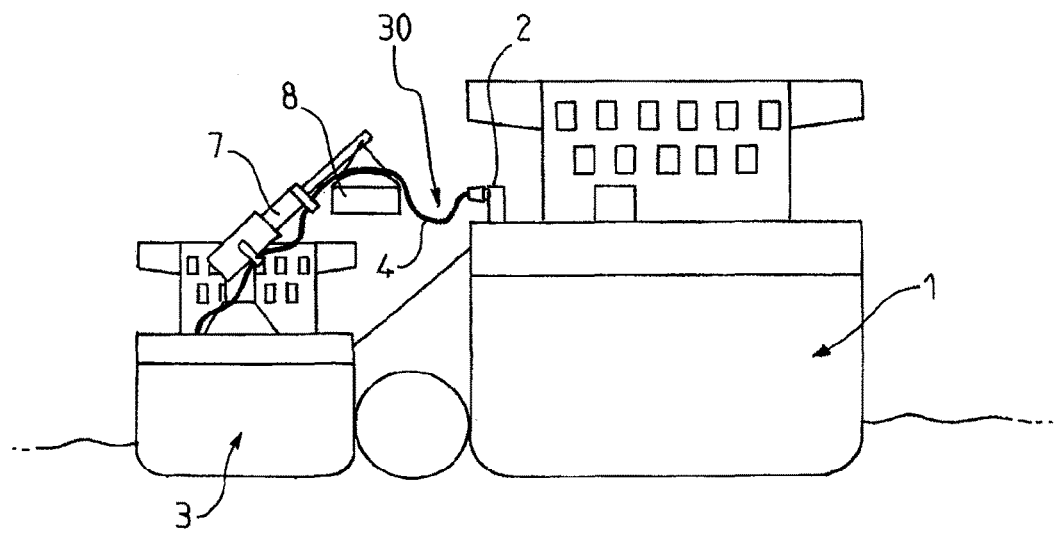
FIG. 3 is a schematic view of the system of FIG. 1 during the step of creating a loop of slack.

Following this connection, with reference to FIG. 3, a loop of slack 30 is created using the telescopic arm 7 and the support carriage 8. In order to obtain a loop, the hose 4 needs to have a shape comparable to the letter U thereby forming a loop facing downward. This loop of slack 30 serves to absorb the relative movements of the ships in relation to one another, which are caused by the effect of the swell 22. It avoids pulling that would be destructive for the flexible pipelines 4 and their points of anchorage or connection that the relative movements of the ships would produce if these flexible pipelines 4 between the two vessels were taut.

Figure 10:
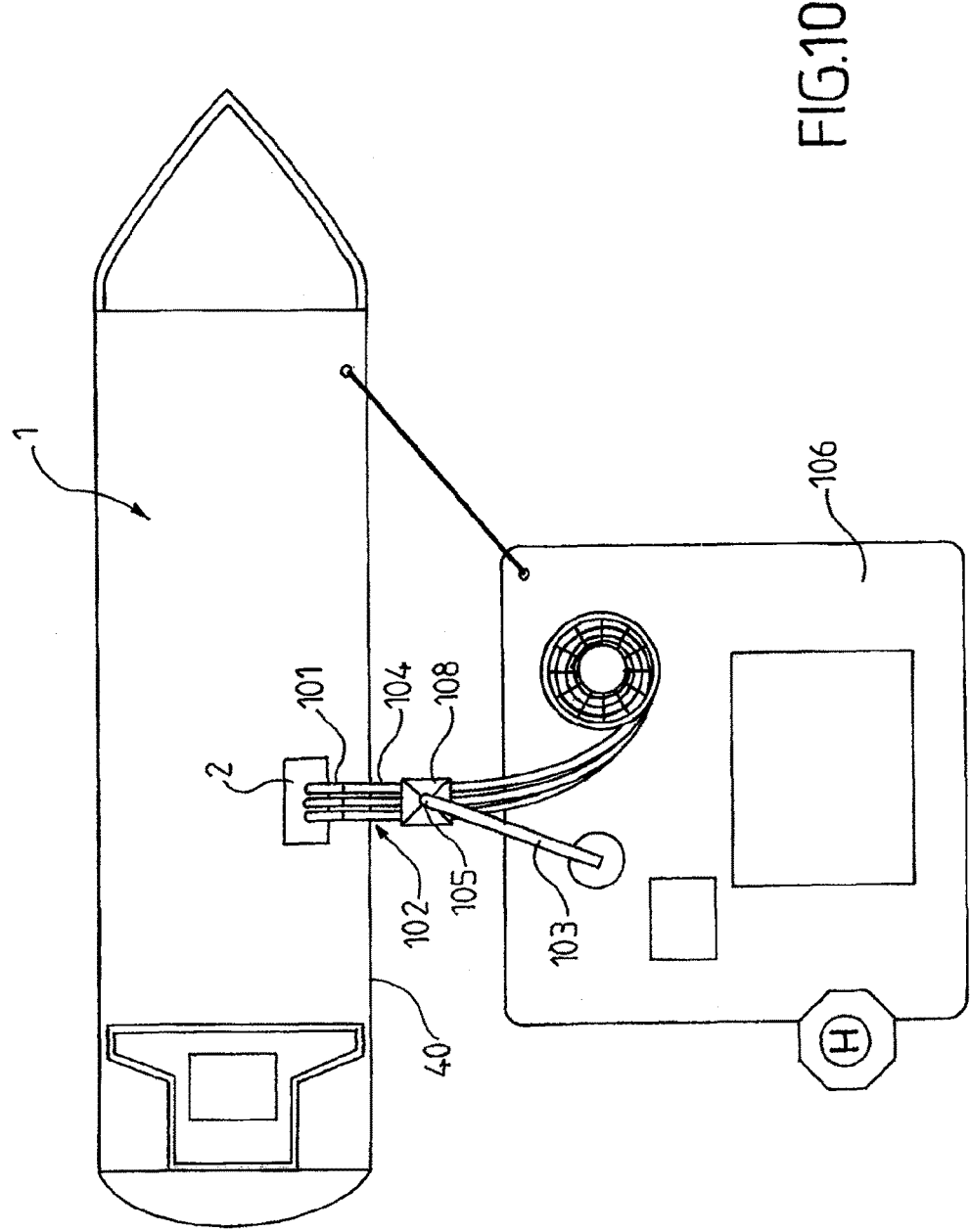
FIG. 10 is a schematic perspective view illustrating the relative position of a client ship with respect to a service station and that of the flexible pipelines with respect to the client ship.

With reference to FIG. 10, the flexible pipelines 104 need additionally to be positioned in line with the hoses 101 of the client bunkering station 2. On the client ship 1, the hoses 101 are directed at right angles 102 to the plating 40 of the client ship 1. The pipelines 104 have also to be offered up at right angles 102 to this plating 40, using the support carriage 108. To do that, on the service station 106, the crane 103 incorporates a pivoting head 105 so that the orientation of the support carriage 108 can be controlled to be at right angles 102 to the side of the client ship 1. Thus, the flexible pipelines 104 are offered up in line with the hoses 101 of the client ship 1.

Once this step has been performed, the transfer operation can take place.

Figure 4:
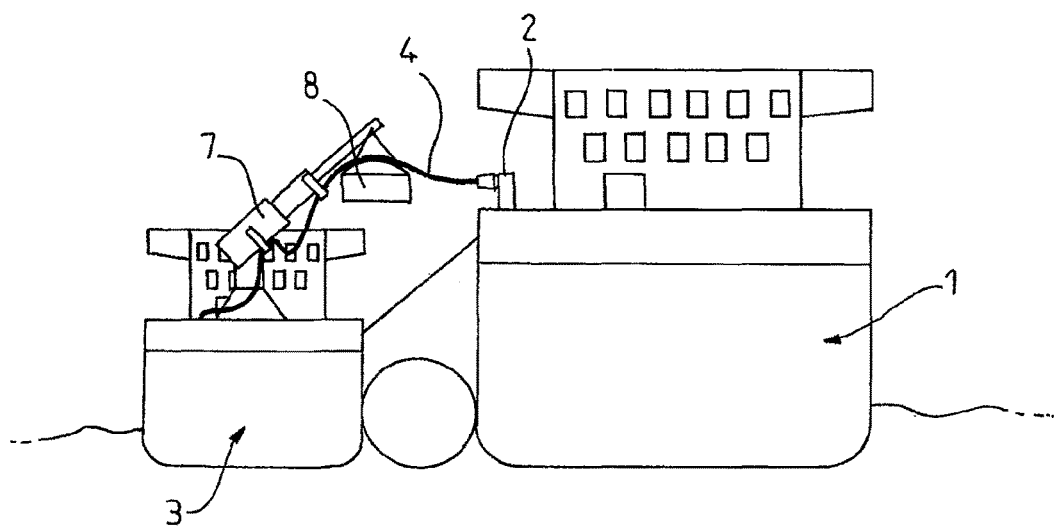
FIG. 4 is a schematic view of the system of FIG. 1 during the step of removing the loop of slack.

With reference to FIG. 4, after the transfer, disconnection needs to be performed. This begins by removing the loop of slack 30. To do that, the support carriage 8 is provided with a device that allows each of the flexible pipelines 4 to be pulled or pushed. The support carriage 8 is then positioned at the uppermost point and the flexible pipelines 4 are shortened by winding them onto the drum 5. The flexible pipelines 4 can then be purged under gravity.

The flexible pipelines 4 need then to be inerted before or after disconnecting. This inerting step is aimed at protecting the installations. Specifically, following the transfer operation, gases may be present in the pipelines 4 and in contact with the ambient air. These fuel gases find themselves in the presence of an oxidant—oxygen—propitious to the creation of an explosive atmosphere that would then require only a source of ignition—energy or heat. That could, for example, be static electricity, which is a source that is difficult to control. Injecting an inerting gas such as nitrogen into the gaseous head space of the chamber replaces the air and reduces the oxygen concentration, avoiding the risks of explosion.

Carbon dioxide $CO_2$ for example is also used as an inert gas. Nitrogen has the further advantage when substituted for oxygen $O_2$ of reducing the humidity and therefore the oxidation. In addition, nitrogen does not contaminate the LNG. Finally, liquid nitrogen allows gas vapors to be treated by cryocondensation. In this way, the pipelines 4 are protected from the risk of explosion.

Figure 13:
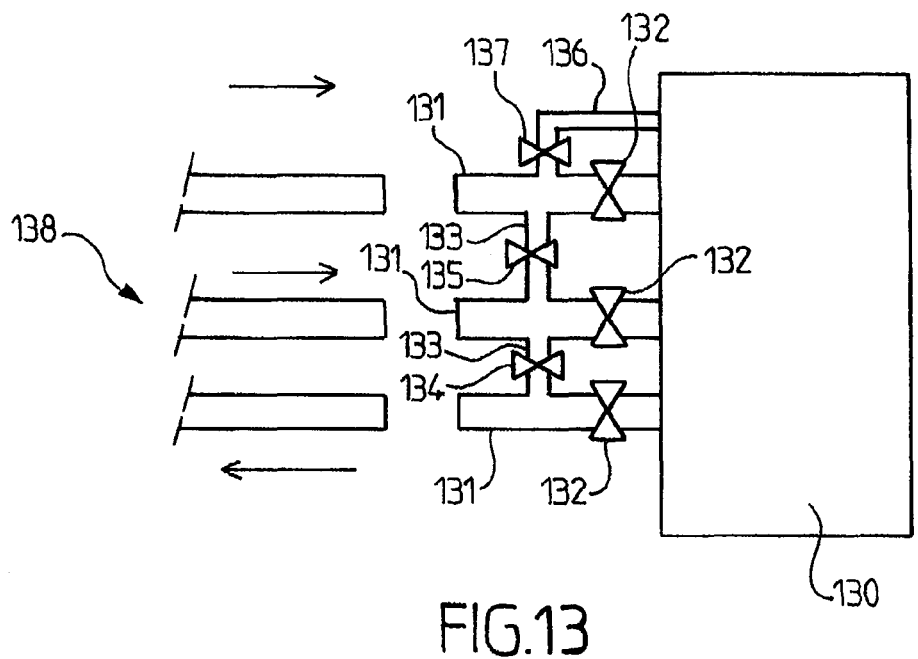
FIG. 13 is a schematic view of a bunkering station comprising inerting and pre-cooling means.

FIG. 13 illustrates a bunkering station 130 of a client ship 1, which station is equipped with pipes 131 including valves 132 on the direct path. This bunkering station 130 further comprises a system of additional pipes 133 with respect to the flexible conduits connection system for the loading/ unloading of LNG. These pipes 133 connect together the pipes 131 that allow the circulation of LNG or dinitrogen for example, between the pipelines 138 denoted in their entirety, of the resupply ship 3. During the loading phase, the valves 132 are open and the valves 134, 135, 137 are closed to allow the client ship 1 to be resupplied. During emptying, only the valve 137 is closed. Finally, during an inerting phase, the valves 132 are closed while the others are open. Dinitrogen from the pipe 136 is then injected into the pipelines 138, using the bypassing circuits made up of the pipes 133 and the open valves 134, 135 and 137.

Figure 5:
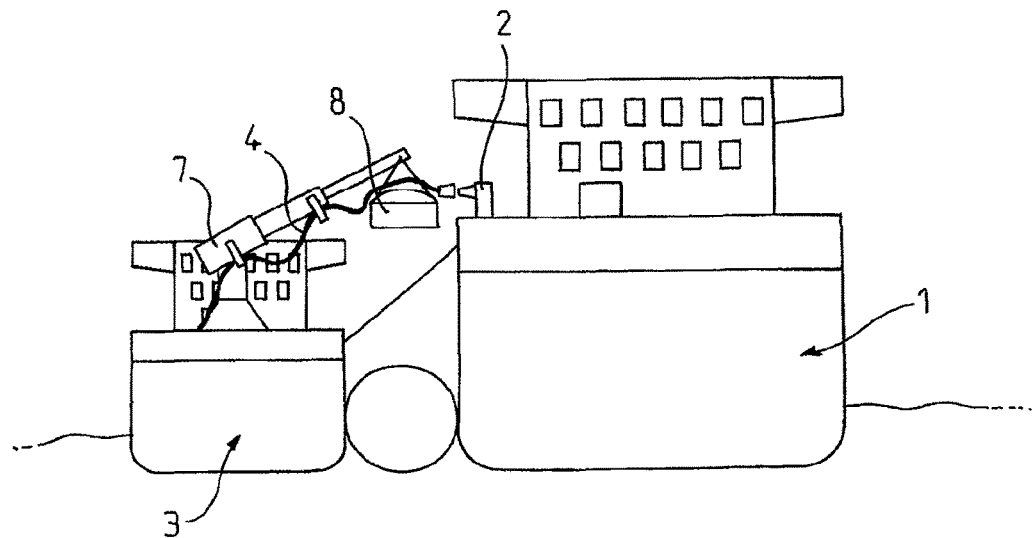
FIG. 5 is a schematic view of the system of FIG. 1 during the step of disconnecting and emptying.

Next, with reference to FIG. 5, the flexible pipelines 4 need to be disconnected. Following this disconnection, the flexible pipelines 4 are placed in a parked position so as to immobilize the flexible pipelines 4 on the support carriage 8 to allow the support carriage 8 to be maneuvered.

Figure 6:
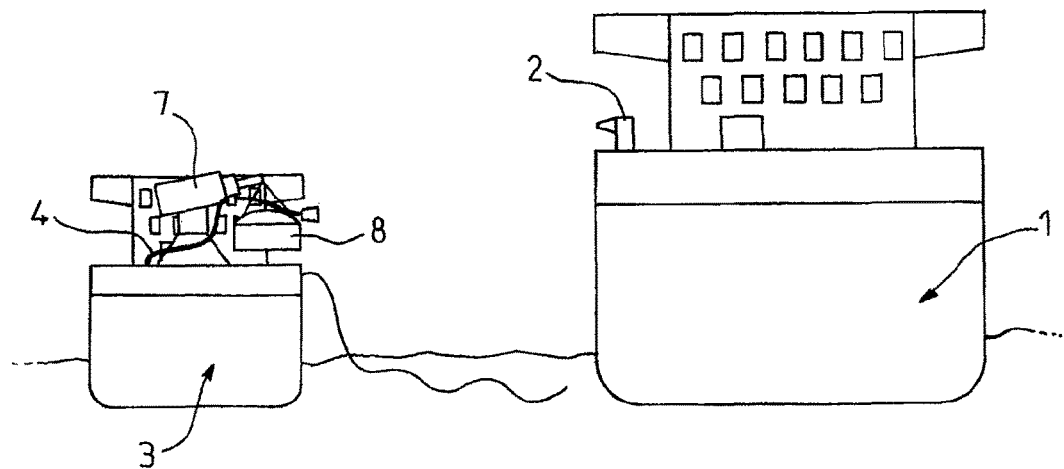
FIG. 6 is a schematic view of the system of FIG. 1 during the step of retracting the crane.

With reference to FIG. 6, the telescopic arm 7 is retracted and the support carriage 8 is returned to the navigation position on the resupply ship 3. The flexible pipelines 4 are wound onto the storage drum 5.

In the above description, the telescopic arm 7 may be that of a folding or telescopic crane capable of bearing the load of the assembly comprising support carriage 8 and flexible pipelines 4.

The drum 5 has a vertical axis. It allows several large-diameter cryogenic or otherwise flexible pipelines to be wound onto the deck of the resupply ship 3. It allows one or more flexible pipelines to be wound up or paid out independently or otherwise, for the purposes of performing the transfer of cargo. It notably allows the flexible conduits to be emptied under gravity.

Following a description of the transfer system and a way of use on a resupply ship 3, embodiments of the support carriage 8 that can be employed in this system will be described.

Figure 7:
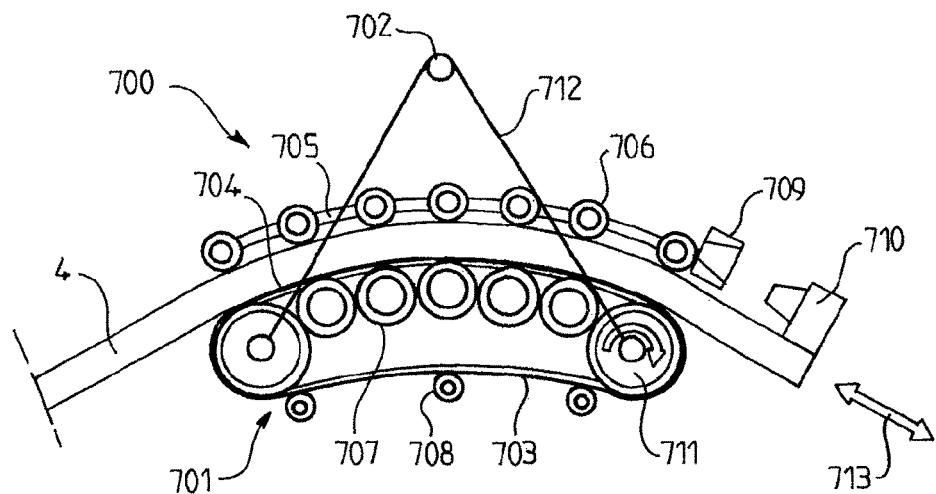
FIG. 7 is a schematic view of a support shoe according to a first embodiment.

With reference to FIG. 7, according to a first embodiment, the support carriage denoted in its entirety by the reference 700 comprises a frame denoted in its entirety by the reference 701, bearing a guided caterpillar track 703 of which the upper part 704 serves to support the flexible pipeline 4. A set of rolls 707 imparts to this upper part 704 of the guided caterpillar track 703 a curvature of which the radius of curvature is greater than or equal to the minimum radius of curvature required by the flexible pipeline 4. The frame 701 is connected by yokes 712 to a lifting eye 702 that allows the device to be attached to a crane. The support carriage 700 also includes means 705 of holding the flexible pipeline 4 in position. These means comprise rollers 706 pressed against the flexible pipeline 4 to prevent it from moving away from the upper part 704. In order to allow the maneuvering of the flexible pipeline 4 described in the preceding figures, the support carriage 700 comprises a means of driving the flexible pipeline. In the case of this embodiment, the drive means is made up of the guided caterpillar track 703 which acts as a support and of at least one actuator 711, for example a motor, that allows the caterpillar track 703 to be moved forward or back 713. To supplement this drive, the rollers 706 may also be motorized.

Finally, the support carriage 700 comprises a docking station 709, that allows the flexible pipeline 4 to be held by its end flange 710 in a precise and secure position. This arrangement means that the crane can be made to carry out maneuvers as if it were a rigid arm. This docking station 709 prevents the end of the flexible pipeline 4 and flange thereof from swinging around during the connection phases and the operations of bringing to a parked position.

Figure 8:
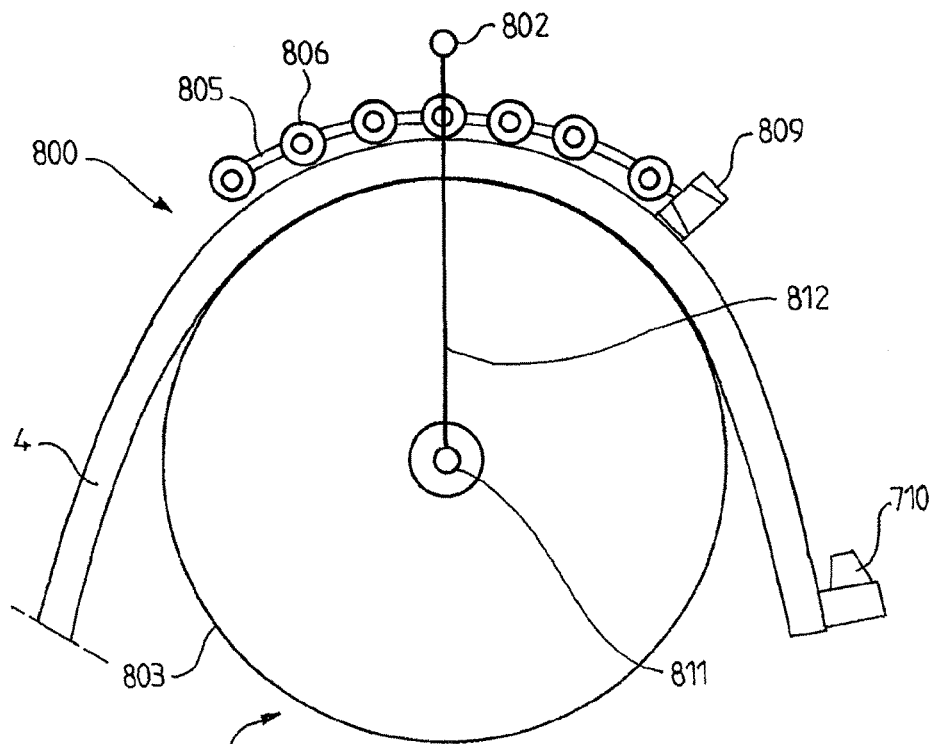
FIG. 8 is a schematic view of a support shoe according to a second embodiment.

With reference to FIG. 8, according to another embodiment, the support carriage, denoted in its entirety by the reference 800, comprises a frame 801 consisting of an axis of rotation 811 and of a two-armed yoke 812. A lifting eye 802 arranged at the end of the arms 812 allows this support carriage 800 to be attached to a crane. In this embodiment, the flexible pipeline 4 is supported by a wheel 803 mounted to pivot on the axis 811 which also allows it to move. The radius of this wheel 803 is greater than or equal to the minimum radius of curvature required by the flexible pipeline 4. In this embodiment, the pipeline is held by a set of rolls 805 grouping together rolls 806. Lateral retention, not depicted in the figure, is provided by a groove present in the wheel 803 and the depth and width of which are able to accommodate the flexible pipeline 4. The groove may for example have the shape of a circular arc in order better to match that of the flexible pipeline 4 that is to be supported and driven. To hold the end of the flexible pipeline 4 during certain operations, the support carriage 800 also comprises a docking station which is in all respects similar to and performs the same purpose as the one described in FIG. 7.

According to alternative forms of embodiment of the drive means, the function may be performed by a roller, a set of rollers, a system of meshing between a pinion and the flexible pipeline 4, in which system a rack would be arranged attached to the flexible pipeline 4. This means may even be made up of a worm associated with a toothset present on the surface of the flexible pipeline 4. Moreover, according to the means employed, the drive means may be arranged under the flexible pipeline 4 as in FIGS. 7 and 8 and act as a support. It may also be positioned off to the side acting as a lateral guide. In this case, the supporting function may be performed by a guide coated with a material that gives it a suitable, preferably low, coefficient of friction but may also be performed by a free caterpillar track or even a set of rolls.

According to one alternative form of embodiment of the fixing means 702, 802, it is possible to include means for controlling the rotation of the support carriage with respect to a vertical axis in the absence of a pivoting head incorporated into the crane.

Figure 9:
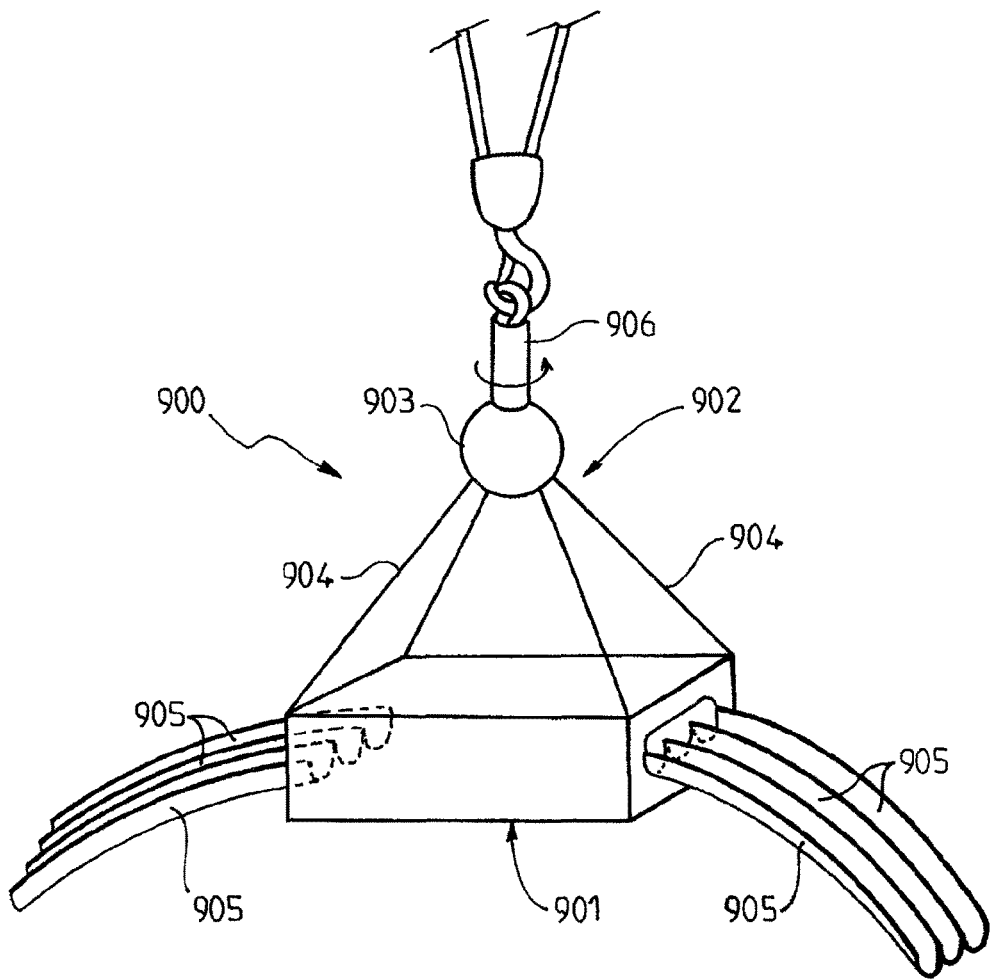
FIG. 9 is a schematic view of a support shoe according to a third embodiment.

With reference to FIG. 9, the support carriage denoted in its entirety by the reference 900 comprises a frame of rectangular parallelepipedal shape, denoted in its entirety by the reference 901. This frame is suspended from the crane by a fixing device denoted in its entirety by the reference 902. This fixing device comprises cables 904 fixed to the four corners of the frame 901. These cables enter a sphere 903 in which they may either be trapped or slide. Fixed to the top of the sphere 903 is an actuator 906 able to control rotation of the sphere 903 about a vertical axis with respect to the point of anchorage to the crane. Thus it is possible to orient the support carriage 900 in such a way that the flexible hoses it supports are offered up in a horizontal plane perpendicular to the client ship 1. The frame 901 of this support carriage 900 comprises several guides 905 for guiding several flexible hoses, not depicted. These guides 905 have a convex shape facing upward. This shape allows the permissible radius of curvature of the flexible pipelines 4 to be respected and notably makes it possible to remain above the minimum radius of curvature. The objective is to prevent the flexible pipelines from being damaged by too small a radius of curvature.

These guides 905 may for example include rollers, to limit the friction on the flexible pipeline 4.

According to one embodiment, the support carriage is suspended from the crane by rigid fixing means. During use of a crane with a head that can pivot about the vertical axis, that allows greater control over the positioning of the support carriage so that the flexible pipelines are aligned with the hoses of the client.

According to another embodiment, it is also possible to add load-reacting means to the fixing means.

According to another embodiment, the architecture of the support carriage is modular so as to allow the same function to be performed simultaneously for several flexible pipelines. In that case, each module independently of the others allows the flexible pipeline it supports to be maneuvered. This architecture then allows the desired number of support carriages to be coupled together according to the number of flexible pipelines to be managed. In this architecture, it is possible on the one hand to group several LNG lines together to increase the rate of flow of LNG transferred between the boats, but it is also possible to include a vapor return line, a line for transferring nitrogen vapor, intended to inert a flexible pipeline after use for example, or even utility lines in order for example to transfer heavy fuel (perform HFO).

According to another embodiment, the support carriage is not modular but is able simultaneously to maneuver several flexible pipelines. The support carriage is therefore produced to maneuver a definite number of hoses.

In order to improve the effectiveness of the connection operation and make it easier to transfer the flexible conduits from the source toward the client ship 1, a flange for the pre-anchoring of the flexible pipelines may be added to the device. This is because the elementary system comprising one flange per pipeline in order to perform the connection makes the connection operation repetitive and causes time to be lost.

Figure 11:
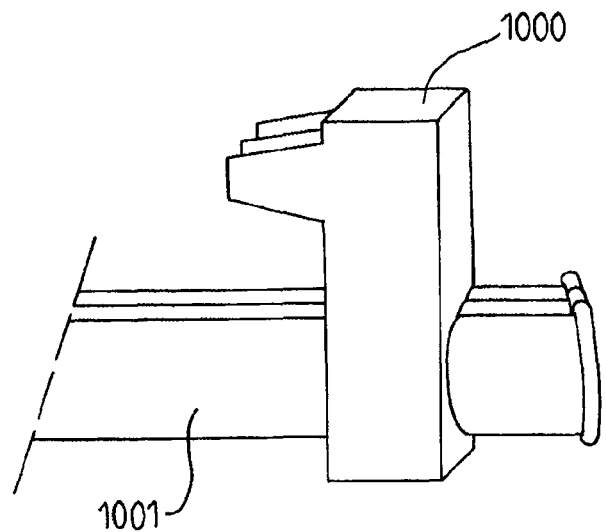
FIG. 11 is a schematic side view of the end of the pipelines with a pre-anchoring flange.
Figure 12:
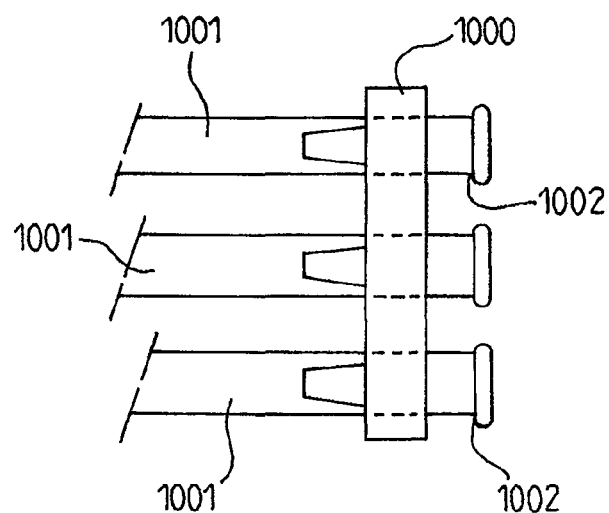
FIG. 12 is a schematic view from above of the pre-anchoring flange depicted in FIG. 11.

With reference to FIGS. 11 and 12, the pre-anchoring flange 1000 connects together the end flanges 1002 of the flexible pipelines 1001 by simultaneously carrying all the connections to the client ship 1. The latter can then couple all of the pipelines by a direct connection to its bunkering pipes that is compatible with this coupling system.

According to one embodiment, the pre-anchoring flange 1000 may in addition be anchored to the client ship 1, and in addition allow the flexible hoses 1001 to be detached one by one and coupled one by one to the bunkering pipes 101 of the client ship 1. For that purpose, clamping collars are provided in the flange 1000 for individually clamping or unclamping each flexible hose 1001. In the unclamped position, the flexible hose 1001 can be removed from the flange 1000 to be positioned freely. This embodiment makes it possible to have a system that is universal and addresses the problem of compatibility of the pre-anchoring flange 1000 encountered with the bunkering system of certain client ships 1. In this way, both situations can be catered for.

Figure 14:
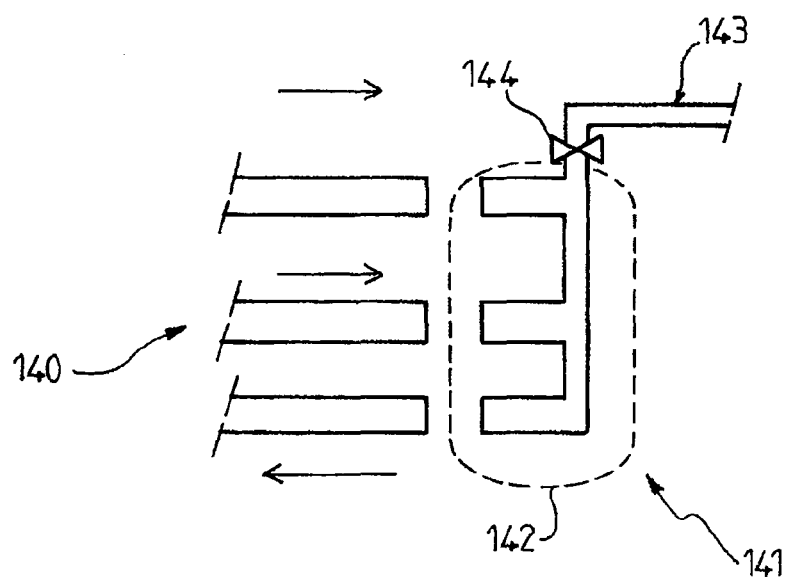
FIG. 14 is a schematic view of a parking station comprising inerting and pre-cooling means.

According to one embodiment depicted in FIG. 14, in order to guard against the client ship 1 having no means of performing inerting before the bunkering station of the client ship 1 is disconnected, the resupply ship 3 comprises a parking station that allows inerting to be performed once the flexible pipelines have been disconnected.

With reference to FIG. 14, the ends of the flexile pipelines denoted in their entirety by the reference 140 coming from the support carriage 8 are coupled to an immobilizing station denoted in its entirety by the reference 141. This immobilizing station 141 is for example separated from the support carriage 8 and arranged on the deck of the resupply ship 3. This immobilizing station 141 allows all the pipelines 140 to be connected to one another via a network 142 of bypassing pipes. This network 142 is also coupled to a nitrogen inlet pipe 143 that allows dinitrogen to be supplied for performing the inerting. A valve 144 is also arranged in the circuit, between the network 142 and the nitrogen inlet pipe 143. This device further allows the transfer system to go through a pre-cooling phase using nitrogen or NG. It also allows the LNG to be circulated in a loop in the cryogenic lines before the flexible pipelines 140 are brought into position. To do that, the valve 144 is closed and only the network 142 of bypassing pipes connected to the pipelines 140 is used. That allows the latter to be cooled effectively and simplifies the management of the pre-expansion phenomenon also known as flash gas associated with the cooling. The fact that this operation is performed in parallel with another also makes it possible to reduce the resupply cycle time.

In an extreme case in which resupply rotations are scheduled to be very closely spaced in time, it is possible for the pipelines not to be emptied fully, for the support carriage 8 to be retracted to the parked position and for the pipelines 4 to be kept cold between two transfers by circulating LNG in a loop. This method offers the advantage of limiting the problems associated with the management of flashes of gas in the cooling of the flexible pipelines.

According to one embodiment, the docking station 709 of FIG. 7 is able to perform functions characterizing the immobilizing station of FIG. 14, notably the circulation of LNG in a loop for pre-cooling and the supply of an inerting gas such as nitrogen to perform inerting.

The description has been given with reference to an off-shore ship or service station equipped with a transfer system for supplying a client ship 1. This transfer system may for example also be able to be fitted to a ship so that the ship can be connected to an on-shore facility. Likewise, an on-shore terminal equipped with the transfer system may supply client ships or even a client ship 1 may be equipped with the transfer device in order to replenish its fuel supplies.

Although the invention has been described in conjunction with a number of particular embodiments, it is quite obvious that it is not in any way restricted thereto and that it comprises all technical equivalents of the means described and combinations thereof where these fall within the scope of the invention.

The use of the verbs "comprise", "include" and "have" and conjugated forms thereof does not exclude the presence of steps or elements other than those listed in a claim. The use of the indefinite article "a" or "an" for an element or a step does not, unless mentioned otherwise, exclude there being a plurality of such elements or steps. Various means or modules may be embodied in one and the same material element.

Reference signs between parentheses in the claims must not be interpreted as implying limitation on the claim.

The invention claimed is:

1. A motorized support device (8) for a handling system (7) intended to handle at least one flexible pipe (4) for transferring fluid, the support device being characterized in that it comprises:
   a frame (701) able to be suspended from a crane,
   a support (703, 803) borne by the frame, the support having an upper support surface (704, 803) for supporting the flexible pipe (4, 138, 140) on the frame, and
   a drive member borne by the frame and able to drive the flexible pipe in two-way translation in a predetermined longitudinal direction (713).

2. The device as claimed in claim 1, in which the support device further comprises a holding member (709, 809) arranged on the frame and able to collaborate with an end flange (710, 810) of the flexible pipe so as to hold the end flange in a fixed parked position with respect to the frame (701, 801).

3. The device as claimed in claim 2, in which the holding member further comprises a means of inerting the flexible pipe, the inerting means comprising a hose (136, 143) connected to an inerting source and able to pass the inerting gas into the flexible pipe (4, 138, 140).

4. The device as claimed in claim 1, in which the support surface (704, 803) has a curved shape with a convex side facing upward.

5. The device as claimed in claim 1, in which the support (704, 803) is able to move with respect to the frame (701, 801) under the effect of the drive member.

6. The device as claimed in claim 1, in which the support (704, 803) is fixed with respect to the frame (701, 801), the support surface being able to collaborate in a sliding manner with the flexible pipe (4, 138, 140).

7. The device as claimed in claim 1, in which the support comprises a support element able to free-wheel, the support element being selected from the group consisting of: a wheel, a set of rolls, and a caterpillar track.

8. The device as claimed in claim 1, in which the support surface has a shape suited to holding the pipe in the predetermined longitudinal direction.

9. The device as claimed in claim 1, further comprising an attachment member (702, 802, 902) secured to the frame, the attachment member allowing the frame to be attached to a flexible pipe handling system.

10. The device as claimed in claim 9, in which the attachment member (702, 802, 902) is situated above the support surface.

11. The device as claimed in claim 9, in which the attachment member comprises a rotary actuator capable of causing the mobile support to rotate about a vertical axis.

12. The device as claimed in claim 11, in which a guide member comprises guide means arranged above the pipe (705, 805) and able to hold the flexible pipe pressed against the support surface.

13. The device as claimed in claim 11, in which the guide member comprises a guide element selected from the group consisting of: a rigid guide with a low coefficient of friction, a rolls stand and a rollers stand.

14. The device as claimed in claim 11, in which the drive member is selected from the group composed of: a wheel, a roller, a set of rollers, a caterpillar track, a conveyor belt and a pinion able to mesh with a toothset belonging to the pipe.

15. The device as claimed in claim 1, comprising a guide member (905) for holding the flexible pipe in a fixed longitudinal orientation with respect to the support, the guide member being secured to the frame (701, 901).

16. The device as claimed in claim 15, in which the guide member (905) is arranged longitudinally on each side of the support surface (704, 803).

17. A modular support comprising a plurality of support devices as claimed in claim 1, the devices being juxtaposed in such a way that the predetermined longitudinal directions are parallel, in which support the frames of the support devices have attachments able to connect said frames in the juxtaposed position.

18. A handling system intended for handling at least one flexible pipe, the system comprising a crane (7) and a support device (8) or a modular support as claimed in claim 1, the frame of which is attached to the crane.

* * * * *